United States Patent [19]

Stange et al.

[11] Patent Number: 4,590,779
[45] Date of Patent: May 27, 1986

[54] PROGRAM-CONTROLLED FRAME BENDING METHOD AND APPARATUS

[75] Inventors: Ronald R. Stange, Littleton; Dennis J. Ekren, Denver; Gary E. De Martelaere, Conifer, all of Colo.

[73] Assignee: Tools for Bending, Inc., Denver, Colo.

[21] Appl. No.: 651,989

[22] Filed: Sep. 18, 1984

[51] Int. Cl.⁴ .............................................. B21D 43/28
[52] U.S. Cl. ...................................... 72/294; 72/305; 72/307; 72/7; 226/158
[58] Field of Search ...................... 72/7, 19, 20, 21, 22, 72/23, 149, 217, 294, 381, 305, 306, 307, 309; 226/158, 162

[56] References Cited

U.S. PATENT DOCUMENTS

| | | | |
|---|---|---|---|
| 3,299,681 | 1/1967 | Hautau | 72/7 |
| 3,426,562 | 2/1969 | Inda | 72/7 |
| 3,808,856 | 5/1974 | Lance | 72/7 |
| 3,964,289 | 6/1976 | Williamson, Jr. | 72/381 |
| 4,100,780 | 7/1978 | Sassak | 72/7 |
| 4,131,003 | 12/1978 | Foster et al. | 72/7 |
| 4,161,110 | 7/1979 | Ritter et al. | 72/7 |
| 4,261,145 | 4/1981 | Bröcking | 52/172 |
| 4,281,530 | 8/1981 | McElhaney | 72/294 |

Primary Examiner—W. D. Bray
Attorney, Agent, or Firm—John E. Reilly

[57] ABSTRACT

A tube bending apparatus made up of a drive motor, bend head and saw together with associated clamping units are mounted on a common work surface, the apparatus being programmed to form rectangular window frames by coordinating the speed of advancement, distance of travel between bends as well as the sequence of bending and cutting with operator input data relating to quantity and frame dimension. The machine can be operated either in a manual or automatic mode, and in the automatic mode is operable at different selected speeds, according to the length of sides of the frame, with a reduced speed interval at the end of each period of advancement preliminary to braking and clamping of the workpiece to perform either a bending or cutting operation.

20 Claims, 11 Drawing Figures

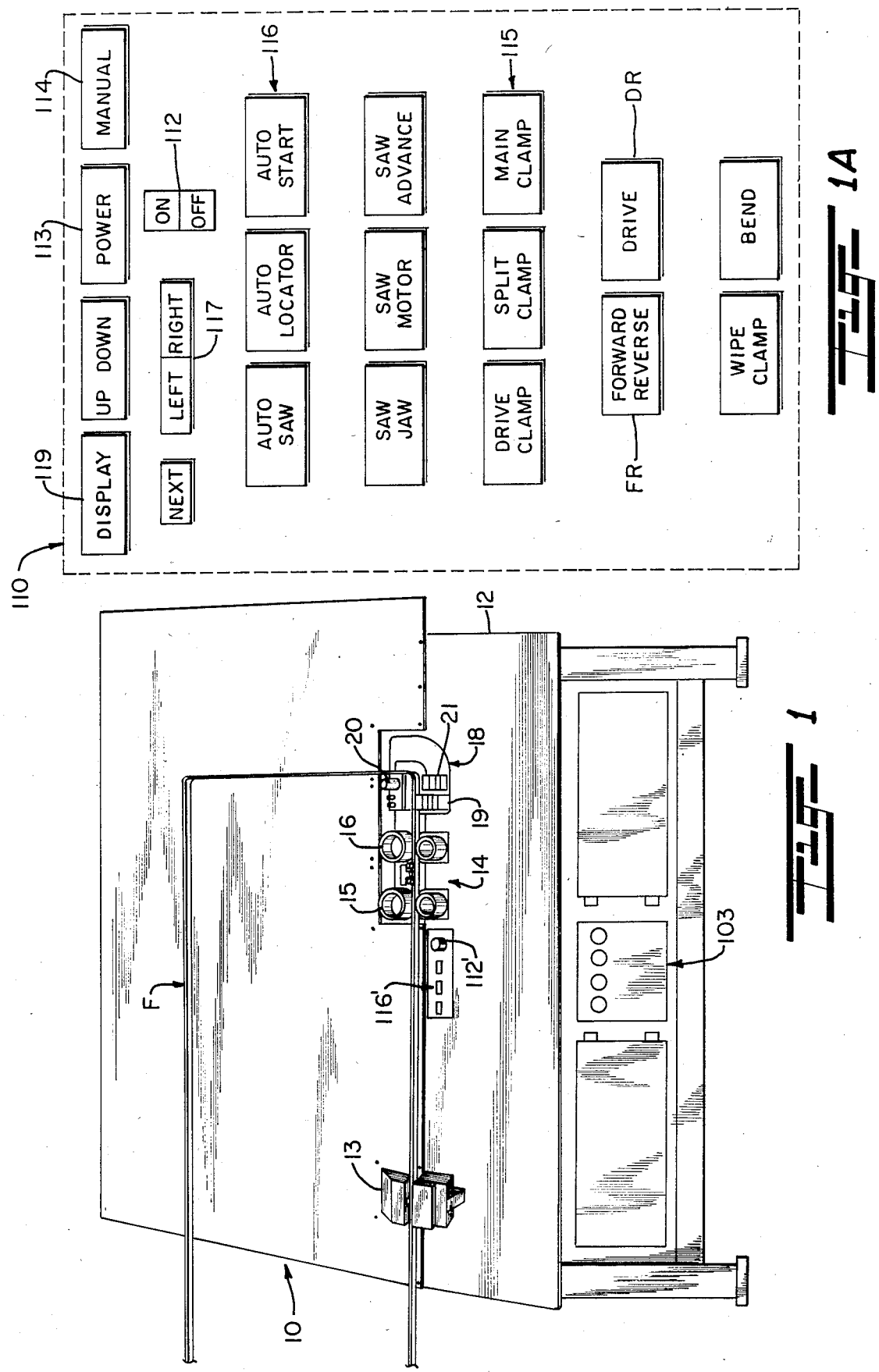

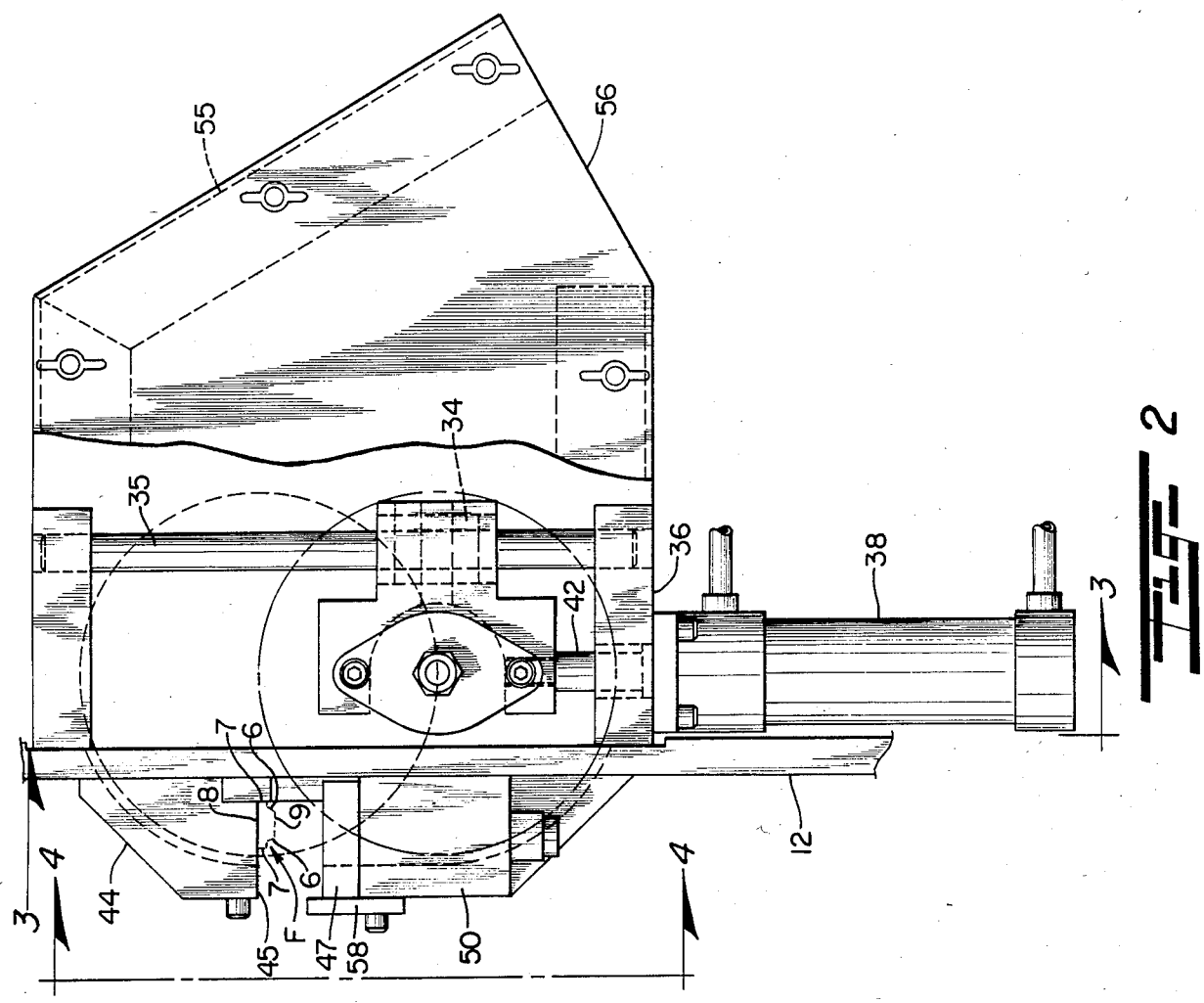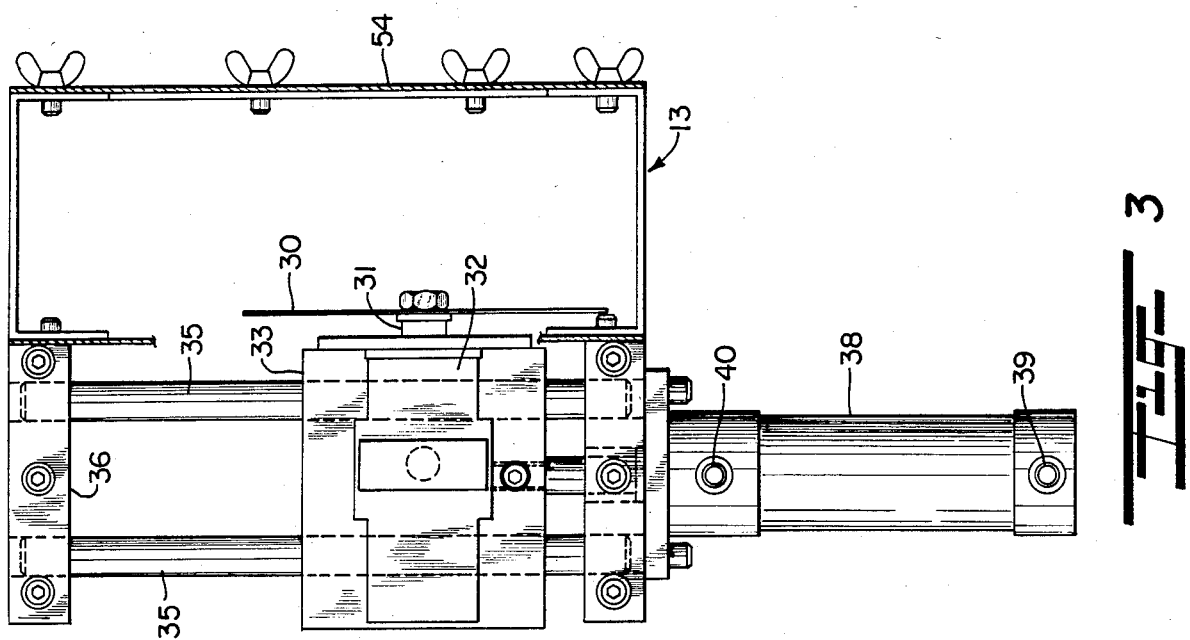

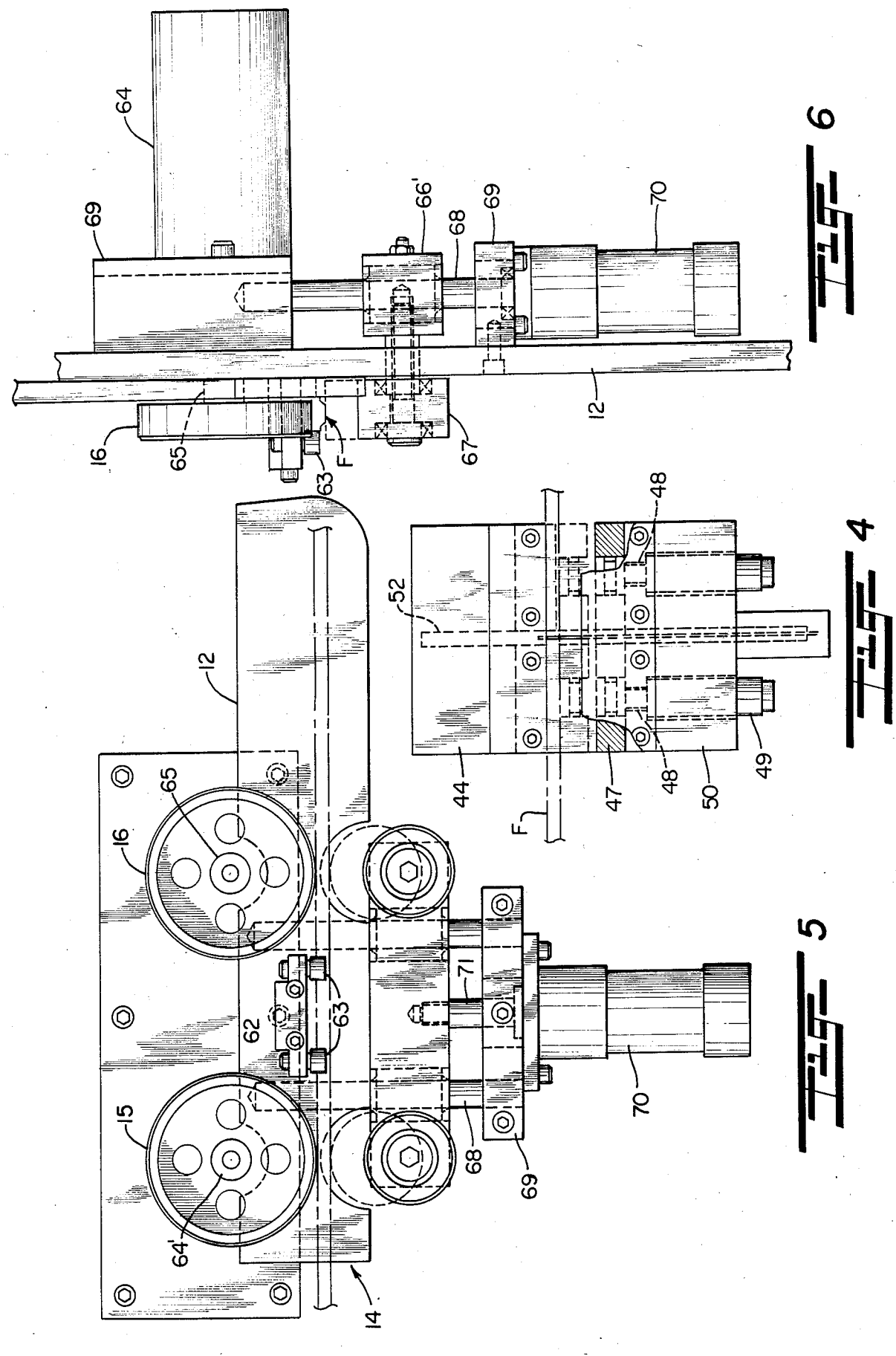

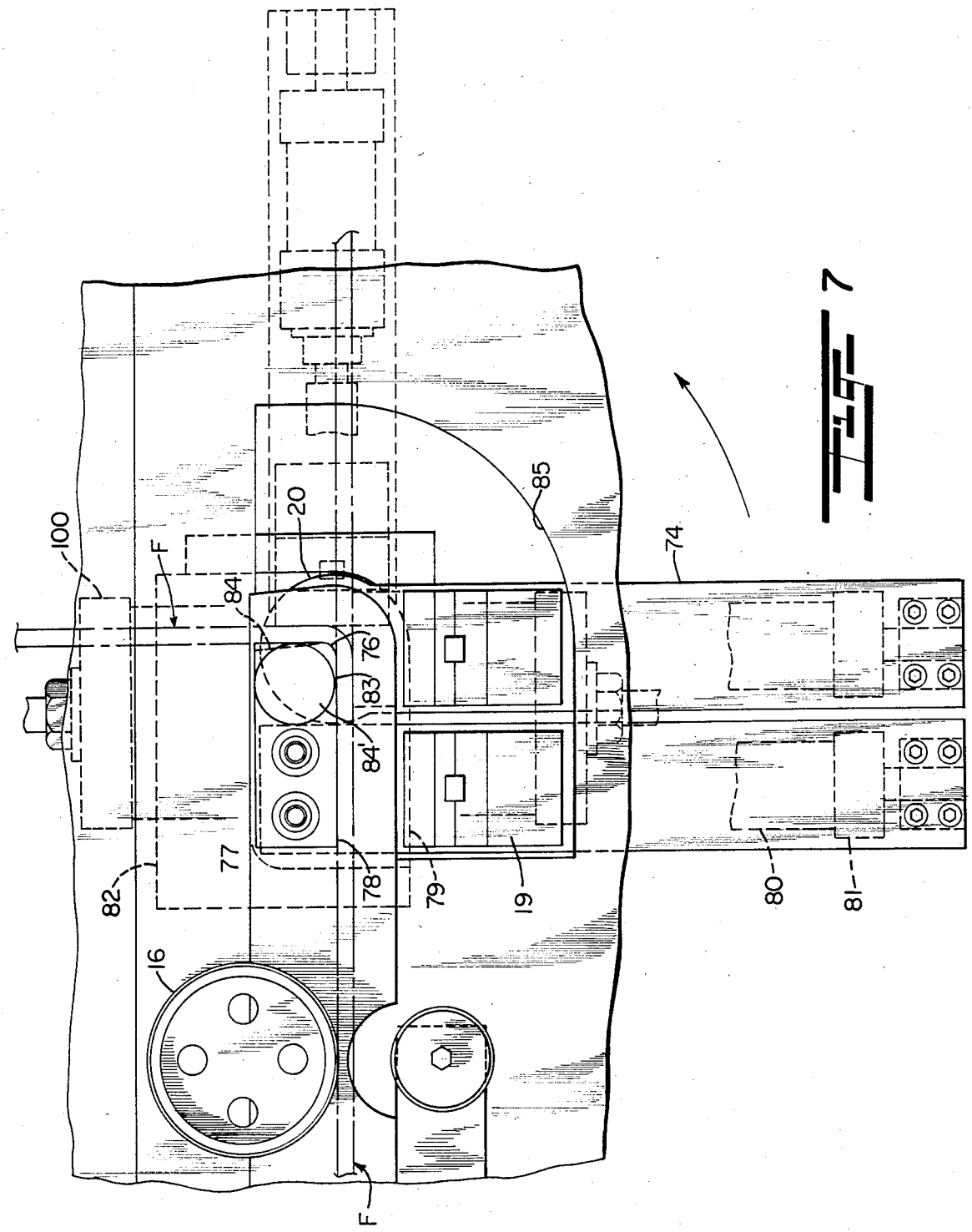

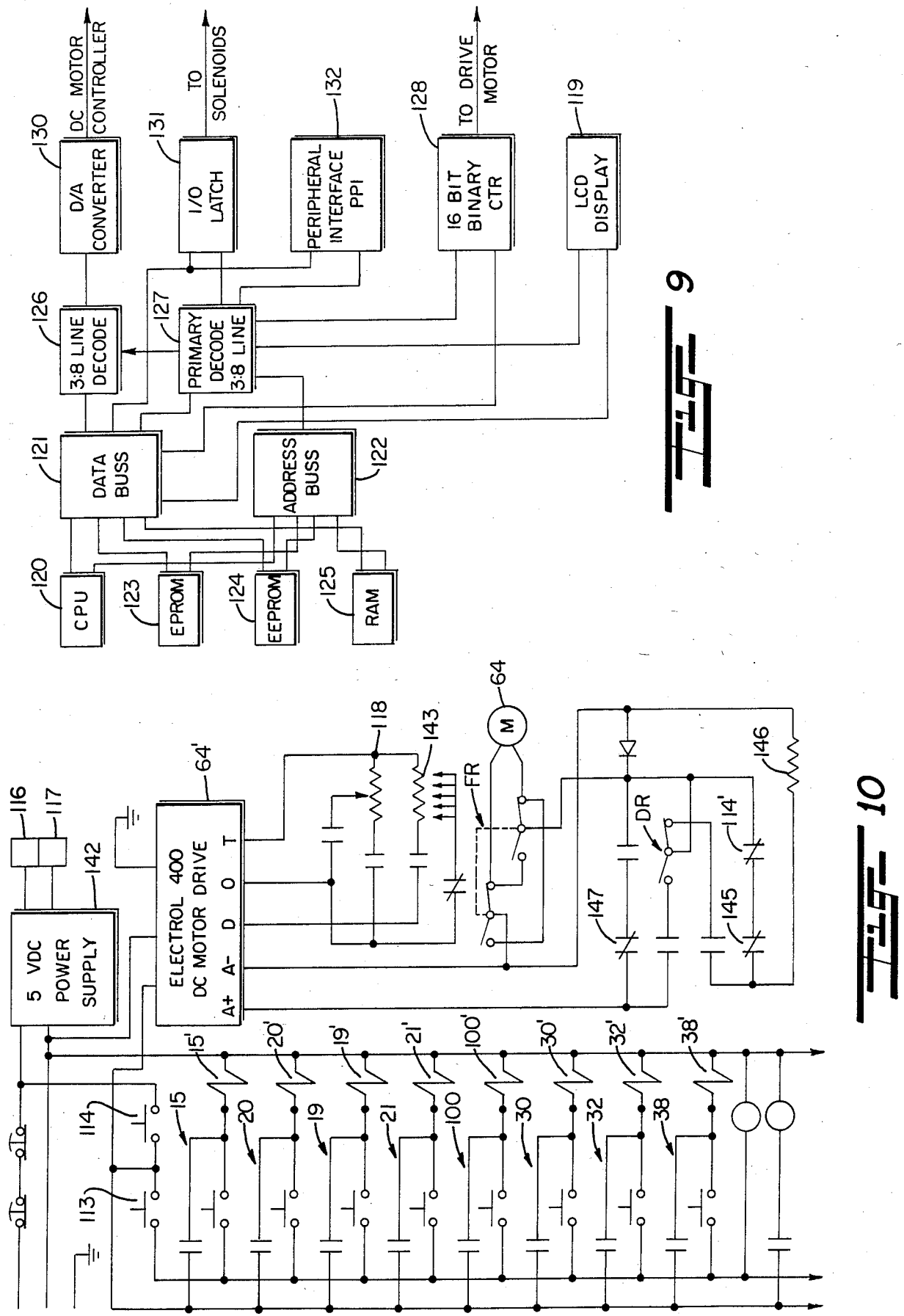

PROGRAM-CONTROLLED FRAME BENDING METHOD AND APPARATUS

This invention relates to tubular frame bending systems; and more particularly relates to a novel and improved method and apparatus for bending and cutting metal tubing into rectangular window frames and the like together with a programmable control system therefor.

BACKGROUND AND FIELD OF THE INVENTION

The bending of metal tubing for special applications, such as, window frames involves a number of considerations in terms of overall length or dimension, cross-sectional size, and the sequence of bending and cutting operations for different lengths. In the production of different sized frames, especially in high volume production, it is desirable to correlate the speed of advancement of the frame section with the overall intended length of the frame as well as the rate of bending for a given cross-sectional configuration or size while at the same time controlling the pressure applied to the frame as it is being bent. Unless the rate of speed is properly controlled with respect to the frame length, there is a tendency to advance the frame member at unduly slow rate of speed and be very time-consuming in turning out sizable quantities of frame members. On the other hand, if the speed selected is too high, it is very difficult to maintain dimensional accuracy in periodically interrupting the advancement of the frame to perform the bend or cut operation. Thus, it is desirable to be able to run the bender at the maximum possible speed for a given length of frame while permitting reduction or deceleration in the speed as it approaches the stopping point for a bending operation. Further, by virtue of the number of variables and parameters that must be considered in bending each different sized frame it is important to closely control the various parameters and to automatically regulate variations in speed, clamping, bending for each different dimension and shape of tube for utmost efficiency and accuracy in operation. Moreover, there are numerous specialized operations in bending and cutting of materials which require manual intervention without interrupting the computer-controlled operation.

Various automated systems have been devised in the past for controlling tube bending operations. To the best of our knowledge, however, none has been devised which will satisfactorily perform the wide range of steps and impose the necessary control in forming rectangular frames for storm window inserts and particularly in such a way as to control the speed of advancement of the workpiece relative to the length between bends, periodic braking and clamping to perform a bend operation, regulate the pressure applied to the frame during the clamping and bending operations, or to vary the bending and cutting pattern according to the length of frame being formed. For example, U.S. Pat. No. 4,261,145 to M. Brocking discloses a method of forming double-paned windows but is concerned specifically with the formation of a butt joint between the cut ends of the frame and wherein the bending apparatus is placed on an inclined work surface or table and requires the use of a movable stop which determines the point or length at which the frame is bent. U.S. Pat. Nos. 4,161,110 to K. Ritter et al and 4,131,003 to G. B. Foster et al disclose automatically controlled bending for rods or tubes as does U.S. Pat. No. 4,100,780 to F. Sassak which discloses a program-controlled bending apparatus to determine the position of bends via orientation and depth of each bend. Moreover, U.S. Pat. Nos. 3,426,562 to F. Inda, 3,808,856 to B. J. Lance and 3,299,681 to C. F. Hautau disclose various apparatus and systems for determining the position or length between bends and a radius or arc of each bend so as to select the proper bending form for the pipe or tube to be bent. Other representative patents are U.S. Pat. Nos. 4,281,530 to W. G. McElhaney and 3,964,289 to J. C. Williamson, Jr.

SUMMARY OF THE INVENTION

Accordingly, it is an object of the present invention to provide for a novel and improved method and apparatus for bending tubular stock into frame members of different dimensions and configuration; and further wherein the method and apparatus of the present invention are operable both manually and automatically to produce a series of controlled bends in converting the straight length of tubular stock into rectangular frames conformable for use as storm window inserts.

It is another object of the present invention to provide for a novel and improved computer-controlled apparatus which will interface stored bend and cut data with manual data according to a desired frame length in the formation of generally rectangular frame members and which is capable of achieving dimensional accuracy at high rates of speed.

A further object of the present invention is to provide for a novel and improved frame bending method and apparatus which is economical, highly simplified in operation and extremely versatile to enable bending and cutting of different lengths of tubular stock material into rectangular frames of different sizes.

A still further object of the present invention is to provide for a novel and improved method and apparatus for forming bends in hollow tubing of irregular cross-section wherein the apparatus is programmed to regulate speed, clamping and bending pressure necessary to achieve dimensional accuracy in bending and cutting the material into a predetermined size and configuration.

In accordance with the present invention, a frame bending machine for automatically bending a continuous length of tubular stock material of generally rectangular cross-section, the machine comprising a platform, drive means including releasable clamping means engageable with the stock material for advancing the material along a straight guide path on the platform, travel-sensing means associated with the drive means to sense the distance of travel of the stock material along the guide path, bending die means at one end of the guide path for receiving each leading end of the stock material, the bending die means having a rotatable die member and means for activating the die member to advance it into clamping engagement with the stock material as the die member is rotated through an angle approximating 90° whereby to bend the stock material to a corresponding angle, and programmable circuit means storing information from the travel-sensing means to activate the drive means at a predetermined rate of speed correlated with the distance of travel of the stock material between the successive bends, the programmable circuit means including means programmed to activate the drive means to successively advance the stock material a predetermined distance between the successive bends, simultaneously release the releasable clamping means and activate the bending die means to form a bend in the stock material, followed by releasing the bending die means and activating the releasable clamping means to advance a predetermined length of material for each next successive bend.

There has been devised in the preferred form a tube bending apparatus comprising a saw and associated clamp, a drive motor and releasable clamp together with a distance measuring encoder and bending clamp to form an established guide path for advancement of a straight length of tubular stock material therealong. In the preferred form, bending apparatus is programmed to form rectangular window frames and to correlate parameters stored relating to speed of advancement, distance of travel between bends with operator input data relating to frame length and sightline or dimension to achieve the desired dimensional accuracy in bending and cutting. The method and apparatus are further programmed to permit timing adjustments with limits set on maximum speed for a given length or dimension between bends. Means are further provided to control the pressure of the clamping members for a given cross-sectional size and bending pressure and in general to require minimum operator intervention in the formation of each rectangular frame.

Considering other more detailed features of the present invention, the saw assembly is located at the leading end of the guide path and employs a fluid-activated saw clamp assembly to engage the frame or workpiece during each sawing procedure. A drive wheel associated with a drive motor and a drive clamp assembly is operable at different selected speeds according to the length of the frame to be formed to select the optimum speed of advancement of the workpiece with a reduced speed interval at the end of each period of advancement preliminary to braking and clamping of the workpiece for the bending step. An optical encoder is associated with the drive clamp assembly and includes a wheel to sense the movement of the workpiece along the guide path as it is advanced by the drive motor wheel. Output signals or pulses generated by the optical encoder are transmitted to the control circuit whereby to enable the circuit to respond to distance of travel of the workpiece to impose the necessary control in reducing speed, braking and clamping the workpiece preliminary to each bend or cut operation as the case may be. The bend head assembly is characterized by clamping the workpiece in two dimensions to properly contain the workpiece during the bending operation and prevent any corner growth as the bending operation is performed at a predetermined rate of speed determined by the computer-controlled circuit. The circuitry further makes a determination as to the sequence of bending and cutting operations to be performed according to the dimension or length of the frame member.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a perspective view illustrating a preferred form of program-controlled frame bending apparatus in accordance with the present invention;

FIG. 1A is an enlarged view in detail of the control panel on the control console;

FIG. 2 is a side elevational view in detail of a preferred form of saw assembly;

FIG. 3 is a bottom elevational view from the underside of the saw assembly illustrated in FIG. 2;

FIG. 4 is a top plan view partially in section of the preferred form of saw assembly shown in FIGS. 2 and 3;

FIG. 5 is a front view in elevation of a preferred form of drive clamp assembly in accordance with the present invention;

FIG. 6 is a side view in elevation of the drive clamp assembly shown in FIG. 5;

FIG. 7 is front elevational view of a preferred form of bending assembly in accordance with the present invention;

FIG. 9 is a flow diagram of the computer control circuit; and

FIG. 10 is a schematic diagram illustrating the electrical interconnection between the control console and the bender apparatus.

DETAILED DESCRIPTION OF THE PREFERRED EMBODIMENT

Figure 8:
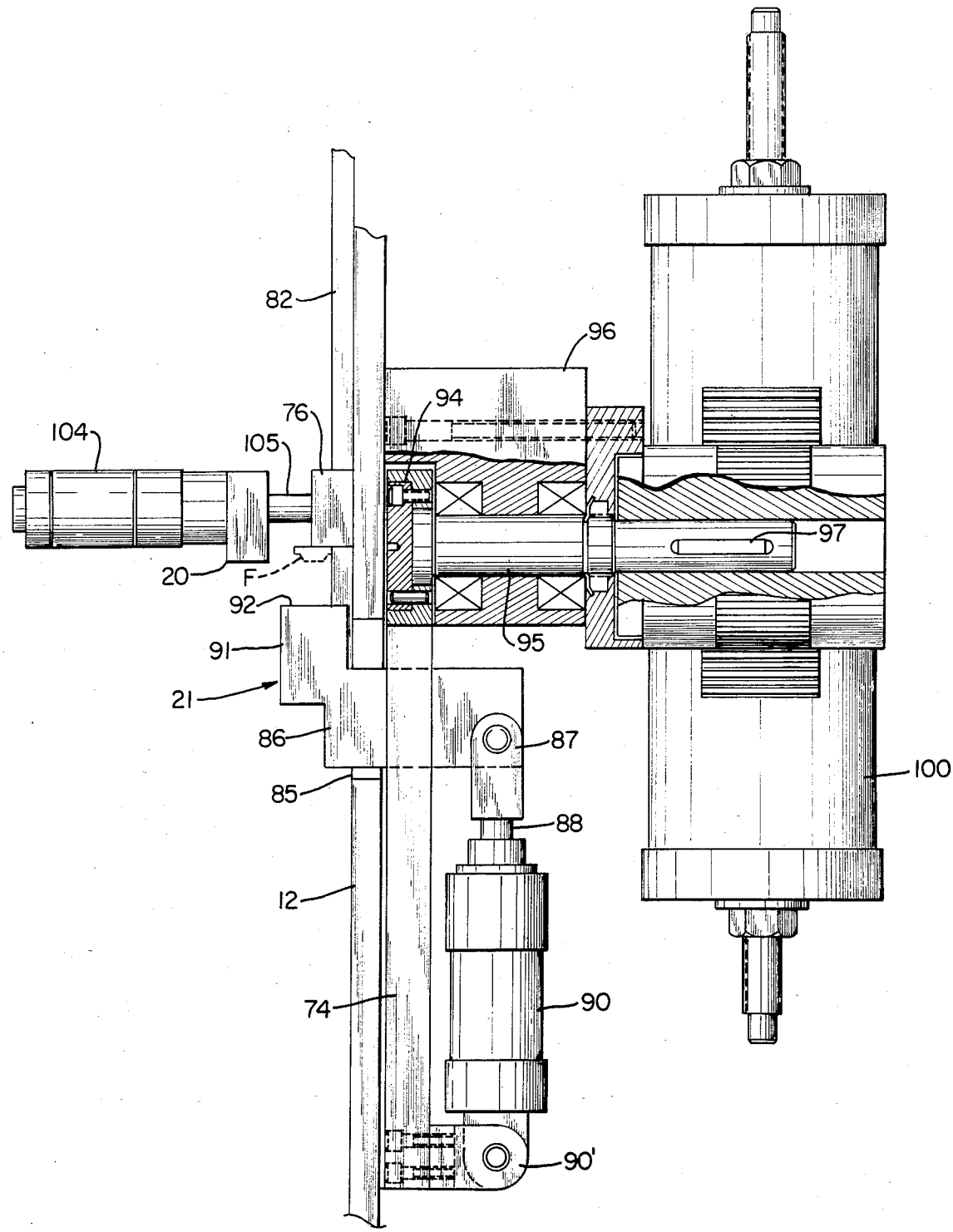
FIG. 8 is a side view partially in section of the bending assembly shown in FIG. 7.

As a setting for the present invention, a preferred form of frame bending apparatus 10 is program-controlled for producing spacer frames of rectangular configuration which are adapted for insertion of either a single pane or pair of spaced panes of glass wherein the completed assembly is specifically adapted for use as a storm window insert. In the preferred method and apparatus, a continuous workpiece or straight length of frame is fed from a continuous length of stock material, not shown, and is driven along a guide path at a predetermined but variable speed correlated with the size of the frame to be formed and, in progressing along the guide path, is automatically bent at predetermined intervals into a rectangular configuration and cut to form the last or final side or end of the frame. Although forming no part of the present invention, the cut ends of the frame are suitably joined together by a key or splice to complete the rectangular frame assembly as a preliminary to insertion of one or more panes of glass into the frame.

Typically, as shown in FIGS. 1 and 2, a frame F of the type employed in forming storm window inserts is of generally hollow rectangular configuration having opposed parallel sidewalls 7, outer end wall 8 and an inner spacer or channel 9 separated from opposed sidewalls 7 by shoulders 6. Important to proper forming and bending of the frame into a rectangular shape is that the inner channel section be bent without either expanding or crushing at the corners so as to permit insertion of the glass into flush relationship to one or both of the shoulder areas 6 which flank the channel. Moveover, in the formation of frames of different sizes, the optimum speed should be selected in relation to the overall dimension of the frame which will assure the necessary accuracy and repeatability in stopping the workpiece as a preliminary to each bending and sawing operation.

In order to accomplish the foregoing, the preferred form of apparatus 10 is broadly made up of an inclined work surface or platform 12 having mounted on its upper exposed face a saw assembly 13, drive clamp assembly 14 including drive motor wheel 15 and travel sensing encoder 16; and a bend die assembly 18 has a main clamp 19, split die clamp 20 and a wipe clamp 21 which cooperate together in bending the workpiece through a 90° angle. Generally, a straight guide path is established by the saw assembly 13, drive clamp assembly 14 and bending assembly 18, the travel sensing encoder 16 being operative to measure the movement or distance of travel of the workpiece along the guide path and, according to the frame dimension selected, is operative through the computer-controlled circuit to periodically interrupt the movement of the workpiece to perform a bending operation as well as a cutting or sawing operation to complete the final side of the frame F.

Referring to FIGS. 2 to 4, a preferred form of saw assembly comprises a circular saw blade 30 drivingly connected to output shaft 31 of motor 32, the motor being disposed in housing 33 which is supported by bearings 34 for reciprocal linear to-and-fro movement on slide carriage 35. The carriage 35 comprises a pair of guide rods as shown which are supported at opposite ends in pillow blocks 36 mounted behind the platform 12. A saw advance cylinder 38 is mounted on the underside of the platform 12 and is provided with inlet and discharge lines 39, 40, respectively to control reciprocal movement of piston 42 which projects through one of the carriage support blocks 36 and has its leading end drivingly connected to the motor housing 33 to control its reciprocal movement.

There is mounted on the upper exposed face of the platform 12 a fixed, generally wedge-shaped support 44 having a squared end surface 45 along which the workpiece F is advanced. As best seen from FIG. 4, a pair of spaced, aligned saw jaws 47 are positioned in juxtaposed relation to one another at the leading ends of a pair of pistons 48 of cylinders 49 for linear advancement from the full line position to the dotted line position in moving into clamping engagement with the workpiece F and forcing it against the fixed support or jaw surface 45. The advance cylinders 49 are mounted in a lower support block 50 which is aligned with the fixed support 44. An intermediate slot 52 extends through the platform 12 and through the fixed support 44 and cylinder support 50 to permit linear advancement of the saw 30 from the position as shown in full in FIG. 2 to the dotted line position. A saw guard housing 55 is disposed beneath the saw assembly and mounted behind the platform 12 and is provided with a lower discharge opening 56 through which cuttings formed in severing the workpiece are free to pass away from the work table or platform 12 and be separately collected. It will be noted further that lower cylinder support 50 is provided with a saw guard 58 which projects beyond the saw jaws 47 and is free to advance into overhanging relation to the fixed jaw surface 45 when the saw jaws 47 are advanced into clamping engagement with the workpiece or frame F. A generally ramp-like support block 59 is disposed between the platform 12 and jaw surface 45 to guide the workpiece into position against the work surface preliminary to clamping engagement by the jaws 47.

As illustrated in FIGS. 5 and 6, an intermediate portion of the guide path is defined by a drive clamp assembly 14 including drive motor wheel 15 and optical encoder 16 which flank opposite sides of a material guide block 62 which is mounted in fixed relation to the upper surface of the platform 12 and provided with spaced rollers 63 which are journaled for rotation about axes disposed in spaced parallel relation to the inclined platform 12 so as to bear against a sidewall of the workpiece F as best seen from FIG. 6. The workpiece is properly aligned on one side of the guide path by the motor drive wheel 15 and encoder wheel 16, each preferably being composed of a knurled steel wheel which will frictionally engage the end surface 8 of the workpiece F.

A motor drive wheel 15 serves as the principal driving member for advancement of the workpiece along the guide path and is drivingly connected to output shaft 64' of a DC drive motor 64 which is mounted on the underside of the platform with its output shaft 64' projecting upwardly through the platform 12. The optical encoder wheel 16 is journaled for rotation on a stub shaft 65 and in a manner to be described measures the distance of travel of the workpiece by being rotated in response to linear advancement of the workpiece against the encoder wheel surface to transmit such information to the control circuit. A drive clamp 66 is in the form of a support block having a pair of spaced rubber wheels 67 mounted thereon in aligned relation to the wheels 15 and 16. The clamping block 66 is disposed for slidable movement on carriage 68 toward and away from clamping engagement with the workpiece under the control of a pneumatic clamp advance cylinder 70 and is mounted in fixed relation to one end of the carriage 68 to support block 69 and has a piston 71 threadedly connected to the clamping block 66. Inlet and discharge lines leading to and from the cylinder in a manner corresponding to that shown and described with respect to the saw advance cylinder 38 control reciprocal movement of the piston 71 and the drive clamp 66 in advancing wheel 67 between the retracted position as shown in full and the clamping position as shown dotted in FIG. 5. In the clamping position, the drive clamp wheel 67 will maintain a constant, predetermined pressure against the workpiece as well as the drive motor wheel 15 and encoder wheel 16 sufficient to assure non-slipping advancement of the workpiece with respect to the wheels 15 and 16.

The bending assembly 18 is stationed at the trailing end of the guide path opposite to the saw assembly and as shown in FIGS. 7 and 8 is made up of a main clamp 19 which serves to locate the workpiece as a preliminary to the bending operation as well as to clamp the workpiece and hold it stationary during the bending operation. As will be hereinafter described, the main clamp 19 is contoured to fit the profile of the workpiece, and it is important that it grip the workpiece in such a way that the workpiece is not allowed to slip during the bending operation. In turn, the wipe clamp 21 is positioned normally in juxtaposed relation to the main clamp 19, the wipe clamp 21 being mounted on a swing arm 74 which is rotatable about the stationary bend die 76 for the purpose of forming a 90° bend in the workpiece W. The split die clamp 20 is cylinder-controlled in a manner to be described to contain the workpiece during the bending operation and prevent any "corner growth".

As shown in FIGS. 7 and 8, the main clamp 19 includes the stationary support block 77 provided with a planar support surface 78 along one side of the guide path in alignment with the motor encoder wheel 16 and a movable clamping surface 79 which is mounted for reciprocal movement toward and away from the opposite side of the guide path to that of the support surface 78 by means of control cylinder 80, the latter mounted in a support housing 81. The movable clamp is of a configuration corresponding to that of the wipe clamp 21 hereinafter described and is similarly controlled in reciprocal movement by the leading end of a piston, not shown, to advance into clamping engagement with the channel surface of the workpiece F. The bend die 76 is preferably in the form of a rectangular plate affixed to a platen plate 82 on the work surface, the bend die having a first surface 83 located along the guide path in alignment with the clamp surface 78 and a second surface 84 located at right angles to the surface 83 and joined by a beveled corner 84.

The wipe clamp 21 corresponds to movable clamp body 79 of the main clamp 19 and, as shown in FIG. 8, includes a clamping body 86 which projects outwardly through an opening in the platform 12 from pivotal connection as at 87 to the leading end of the piston 88 of the clamp advance cylinder 90. The cylinder 90 is pivotally connected as at 90' to the lower end of the swing arm 74 and through inlet and discharge lines, not shown, controls reciprocal movement of the clamping body 86 toward and away from the workpiece F. The clamp body has an offset 91 which projects from the exposed end of the body 86 and terminates in a movable clamping surface 92 which is disposed in spaced parallel relation to the surface 83 of the bending die. The clamping body is free to move through the slot or aperture 85 in the platform to cause the offset portion 91 to advance into clamping engagement with the channel surface 8 on the workpiece F so that the workpiece is firmly clamped between the bending die 76 and offset portion 91. The swing arm 74 depends downwardly from fixed connection as at 94 to one end of a drive spindle 95 which is journaled in spindle housing 96. The spindle housing 96 is affixed to the underside of the platform 12, and the drive spindle 95 projects downwardly from the spindle housing for keyed connection as at 97 to a pinion gear 98 which intermeshingly engages a rack 99 on a double-acting cylinder 100. The cylinder 100 includes an internal piston head which is drivingly connected to the rack 99 and imparts movement to the rack in a direction parallel to the platform whereby to rotate the pinion 98 and attached drive spindle 95 at a speed determined by the setting on a manually adjustable flow control valve as represented at 101. The swing arm 74, being attached to the end of the drive spindle, will follow rotation of the drive spindle and cause the wipe clamp 21 to undergo rotation through a 90° arc from the position as shown in full in FIG. 7 to a horizontally extending dotted line position. In traversing this 90° arc, the wipe clamp 21 is free to advance through the slotted area 85 while being retained in firm engagement with the workpiece under the influence of the advance cylinder 90. The split die clamp 20 is independently regulated by its cylinder 104 to advance along guide shaft 105 into clamping engagement with a sidewall of the workpiece thereby clamping the sides of the workpiece between the split die clamp surface 20' and support or base plate 82. The split die clamp is of circular configuration, as noted from FIG. 7, and is superimposed over the workpiece F as well as the bending die surfaces 83 and 84 so as to completely contain the workpiece during the bending operation.

Preliminary to a consideration of the control circuit and its associated program control, it is important to understand the relationship between the program control and bend head assembly 19 to assure proper bending of different cross-sectional sizes of frames. Essentially, the bend head assembly performs a rotary compression-type bend. The swing arm 74 is mounted for rotation slightly past 90°, and best bending occurs when the swing arm 74 is permitted to rotate the maximum degree of bend allowed by the bend die 76. In this relation, a separate bend die 76 is employed for each different channel or spacer size and defines a rotating, removable crush-type insert which is designed to form the inside of the bend. Too much of a crush can cause material breakage or workpiece deformation; whereas insufficient crush can cause wrinkling along the inside of the frame. The split die clamp 20 is responsible for containing the workpiece during the bending operation to prevent corner growth as stated earlier. In turn, the main clamp 19 locates the workpiece prior to each bending operation as well as to clamp the workpiece and hold it during the bending operation. Thus, the main clamp is contoured to fit the profile of the workpiece and to grip it in such a fashion that the material is not allowed to slip during the bending operation. The wipe clamp 21 which is located alongside the main clamp 19 is mounted on the swing arm 74 and is responsible for forcing the workpiece into the bend die during the bending operation. Although a low pressure setting on the order of 40 psi is normally adequate for the wipe clamp 21, altering this setting can modify the appearance of the bend. The same is true of the rate of bending or speed at which the bending takes place under the control of the flow control valve 101. It is therefore important to correlate the speed and pressure setting for each different frame size together with the time interval for bending as determined by the program control circuit setting. For example, with larger sized frames it is best to reduce the speed of the swing arm to prevent the workpiece from being whiplashed during the bending operation and, accordingly, increased time must be afforded for the bending operation.

In a conventional manner, each of the pneumatic cylinders as described is provided with a separate, manually adjustable pressure regulator and flow control valve to regulate the pressure and speed of travel of each of the cylinders including the rotary actuator cylinder 100. At least the pressure regulator controls can be centrally located in a control housing 103 located beneath the work table or platform 12 and, in the preferred form, are manually controlled independently of the program control circuit now to be described.

PROGRAM CONTROL CIRCUIT

In order to locate the saw assembly a fixed distance from the bend head assembly, it is necessary to provide four different bend patterns to cover all possible ranges of frame sizes or lengths. These bend patterns are selected by the computer according to the final frame dimensions. They are:

bend, bend, bend, cut
bend, bend, cut, bend
bend, cut, bend, bend
cut, bend, bend, bend The bend patterns are provided for producing rectangular frames requiring three bends and where the sequence or order between the cut and bending operations will be determined by activating the saw 30 to perform the cut operation when the optical encoder 16 has signaled that a predetermined length of the workpiece, corresponding to the total dimension of the frame has passed the saw assembly. For example, with larger frames, typically the three bend operations would be performed prior to the cut operation, but with smaller frames the cut operation would be performed prior to or at some intermediate stage between the bend operations.

Referring again to FIG. 1, a control console, not shown, houses the computer and other solid state devices necessary for controlling the bender apparatus. The various switches necessary to run the machine are as designated on a control panel 110 shown in FIG. 1A and consist of the following:

ON/OFF SWITCHES: There is an on/off switch 112 on the control console and a separate on/off switch 112' on the bender itself. When either switch is depressed, all power including that to the computer is interrupted.

POWER SWITCH: A power switch 113 is located on the control console and controls only the functions of the machine external to the control console but does not control the computer or electrical control circuit.

MANUAL SWITCH: A manual switch 114 located on the control console is connected to a relay 114' in the control circuit of FIG. 10 and must be depressed whenever the manual mode switches are to be used. In the automatic mode, the manual switch 114 must be released.

MANUAL MODE SWITCHES: The manual mode switches are clustered together and generally designated at 115 on the control console and are labeled according to their function. To run the machine in the "automatic" mode, all manual mode switches should be released. For example, Forward/Reverse switch FR will control forward or reverse operation of the drive motor; and Drive switch DR when released will cause the motor to be braked in a manner hereinafter described.

AUTO SWITCHES: The auto mode switches are generally designated at 116 on the control console and are labeled according to their function; namely, "auto saw", "auto locator" and "auto stock". Corresponding switches are provided to control the same functions on the bender itself and are designated at 116'.

COMPUTER INPUT SWITCHES: These switches are generally designated at 117 on the control console and are used to answer questions addressed by the computer regarding frame size or set up data and will be hereinafter referenced in more detail. The "up" switch represents a "yes" as well as to permit the cursor on display 119 to be rolled up or down to set dimensions in a manner to be described. The "next" switch represents a "no" or next input, and the "left/right" switch positions the cursor under the proper digit or number representing the desired dimension of the frame or glass in a manner to be described.

MANUAL POTENTIOMETER: In the manual mode, it is possible to vary the speed of the drive motor by rotating a potentiometer, designated 118 in FIG. 10, that is located inside the control console and which affects the drive motor only in the manual mode.

Referring to the flow diagram of FIG. 9, a Complete Microprocessor Development System manufactured and sold by Octagon Systems Corporation of Westminster, Colo. or other suitable form of computer includes a CPU 120 having input lines to a data bus 121 and address bus 122 for the purpose of inputting data and storing it in memory chips 123, 124 and 125. The memory 123 suitably may be EPROM memory to store data pertaining to the main running program, the memory 124 is designated an EEPROM which may store or retain stored values for future reference and the RAM 125. The data bus 121 also inputs information from the CPU 120 to a line decoder 126, primary line decoder 127, 16-bit binary counter 128 and an LCD display 129. The line decoder controls a digital to analog converter 130 for the purpose of electrically controlling a DC motor controller 64' for the motor drive 64, as shown in FIG. 10. The data bus also transmits information via I/O latch 131 to control the activation and deactivation of the various solenoid controls for the pneumatic cylinders in the apparatus as shown in FIG. 9. The primary decoder 127 operates in response to information from the CPU to select those chips to be activated via lines directed to a programmable peripheral interface chip 132 as well as to a counter 128 and the display 119. The binary counter 128 responds to the number of pulses received from the optical encoder 16 to count the distance traveled by the workpiece as it is advanced through the bender apparatus. The line decoder, in turn functions as an output latch to select the speed of operation of the drive motor via the digital-to-analog converter and DC motor controller. A CPU interrupt signal is transmitted by the counter to cause the CPU to reduce the speed of the drive motor 64 when the ramp down value is reached as earlier described thereby causing the motor to reduce its speed over a predetermined number of pulses or counts prior to dynamic braking of the motor. At the end of the ramp down value a braking signal is then directed by the digital-to-analog converter via DC motor controller 64', as shown in FIG. 10, to brake the motor 64 preliminary to each bending operation.

Referring to FIG. 10, there is illustrated the various motor and solenoid controls for the various functions to be performed in the bender apparatus either under manual or automatic control. Generally, as shown, a high voltage power source 135 is directed through the on/off switches 112, 112' to output sides of the manual and power switches 113 and 114. The various automatic and input switches 116 and 117 as denoted on the control panel are directed via a low voltage power supply, such as, the 5 VDC power supply represented at 142 to the solenoid control circuit. The DC motor drive 64 which serves to regulate the drive motor wheel 15 is controlled either by the manual potentiometer 118 or an automatic potentiometer 143. As referred to earilier, when in the manual mode, the Forward/Reverse switch FR serves to control forward or reverse operation of the motor 64. The Drive switch DR operates through a relay 145 to advance or drive the motor in the foward or reverse direction according to the setting of the Forward/Reverse switch FR. Whenever the Drive switch DR is released it will throw braking resistor 146 across the armature of the motor to cause it to brake or stop the advancement of the material. Another relay 147 is correspondingly controlled by the motor controller 64' when the machine is in the automatic mode to automatically brake the motor at the end of a drive length by connecting the braking resistor 146 across the armature of the motor 64. Either of the manual or power switches 113 or 114 is operative when depressed to deactivate the circuit into the various solenoid controls for the mechanical drives and bender apparatus but will not affect one way or another the operation of the computer control circuit. Assuming that the on/off switches 112 and manual and power switches 113 and 114 are closed, control signals can be directed to the various solenoids or pilot controls for the saw advance cylinder 38, the saw motor 32, and the saw jaw 30; to the drive motor wheel 15, the main clamp/locator 19, split die clamp 20, wipe clamp 21 and rotary actuator 100 for the swing arm 74. Those solenoids for the respective cylinders are designated by prime numbers corresponding to the elements controlled by the solenoids. Their sequence of operation will be better understood and appreciated from a consideration of the program control and operation of the system. It should be noted, however, that the drive motor 64 has seven different forward drive speeds controlled by the computer and which determines the proper speed according to the length or size of frame. Generally, the longer the drive length the faster the speed, and vice versa, so that irrespective of the length of drive and the speed selected, there is a reduction in speed or deceleration preliminary to stopping the workpiece each time that a bend operation is to be performed. This reduced speed is designed to aid in the accuracy and repeatability of stopping the workpiece prior to its bending or sawing operation; and where optimum dimensional accuracy and repeatability is achieved when a consistent dwell period is establishing prior to braking of the drive motor. Deceleration or reduction in speed is initiated on a predetermined number of pulse counts which are generated by the optical encoder 16 before the drive motor is to be dynamically braked. The actual speed at the reduced speed level may be preset by the DC motor controller 64', such as a Model No. 400 manufactured and sold by Electrol Corporation of York, Pa. Thus both the actual speed at the reduced speed setting and the dwell period or amount of travel during the dwell speed setting is preset or determined.

The optical encoder system 16 including the encoder wheel 65 is physically located between the drive motor wheel 15 and the bend head assembly 18. The encoder wheel 65 for the encoder is knurled in the same manner as the drive motor wheel 15 for proper gripping or tracking of the workpiece as it is driven along the guide path by the drive motor wheel so as to measure the distance of travel of the workpiece. In the saw assembly, the pneumatic cylinders 48 operte the saw jaws 58 to clamp the workpiece during each saw operation. In turn, the saw blade 30 is controlled by the saw advance cylinder 38 to advance the saw blade through the workpiece in performing the cut operation and can be regulated either manually or by the program control.

A further appreciation of the operation of the apparatus can be gained from a consideration of the program control and the sequence of steps followed in running the program. Assuming that the on/off, manual and power switches are closed, the program will prompt the operator with questions until the machine is ready to run and permit the operator to enter the desired "set up program". By depressing the "up" switch, the "set up program" is entered; and by depressing the "next" switch, the machine will continue to run the program. Specifically, if the "next" switch is depressed, the machine will set up to bend rectangular shaped parts and display the next input:

> Enter 1st Side
> xxxx xx/xx in.

Glass size is entered at this point via a cursor on display 119 which is advanced by the Left/Right switch to position it under the proper size or digit. The digit can be rolled up or down by the up/down switch. The "next" switch is depressed to enter the next input:

> Enter 2nd Side
> xxxx xx/xx in.

The second side dimension of the glass is entered in the same fashion followed by depressing the "next" switch to produce the next input:

> Enter Sightline
> xxxx xx/xx in.

The sightline value is the distance between the edge of the glass to the inside of the spacer frame of the workpiece. Once entered, the "next" switch is depressed for the next input:

> Enter No. of Frames
> xxxxxx

Production quantity is then entered; and, if a quantity is not specified, the program will produce but one part. The "next" switch is depressed to enter the following:

> Locate Stock
> Then Auto-Start

At this point the machine is ready to run by advancing the workpiece along the guide path. If the end of the workpiece needs to be squared up, the end of it is placed in a saw assembly and the autoswitch button is depressed to automatically cut the end of the workpiece. The workpiece is advanced against the main clamp 19 and the autostart button is depressed whereupon the apparatus will automatically produce the frame of the selected size. Whenever a frame is being produced, the motor drive speed will be displayed on the LCD display 119. Anytime that a production quantity of more than one is selected, the apparatus will produce each frame, release the part, pause to permit the operator to remove the workpiece and energize the main clamp so that the next workpiece can automatically be advanced and located. The display will then read:

> Locate Stock
> Then Auto-Start

The computer will now count each part produced and, as each part is produced, the current count is incremented by one until the desired production goal is reached whereupon the computer will return to the top of the MAIN RUNNING PROGRAM and await further instructions.

In the SET UP PROGRAM, depression of the "up" switch will permit alteration of any of the timing values used by the computer to energize the various functions of the machine. These functions and times are displayed in milliseconds and include the following timing functions:

SAW ON DELAY: Delay between commands to close saw jaws and turn on saw motor.

SAW ADVANCE DELAY: Delay between commands to turn on saw motor and start to advance saw blade.

SAW ON DURATION: Time allowed for saw to advance through the workpiece while cutting.

SAW OFF DELAY: Delay between releasing saw advance and stopping saw motor.

SAW EXIT DELAY: Delay between releasing saw jaws and energizing drive motor.

AUTOPART RELEASE: Delay between releasing workpiece after bend and reenergizing main clamp production run.

MAIN CLAMP OPEN: Delay between releasing main clamp and energizing drive motor.

DRIVE CLAMP CLOSE: Delay between closing drive clamp and releasing main clamp.

BEND CLAMP: Delay between energizing bend clamp consisting of main clamp and wipe clamp and advancing rotary actuator for swing arm 74.

BEND UP TIME: Time for rotary actuator to rotate swing arm and is coordinated with the flow control valve setting for the actuator.

WIPE RELEASE TIME: Delay between releasing the wipe and split die clamps and returning the swing arm 74 to original position.

BEND RETURN: Delay between returning swing arm 74 and energizing drive motor wheel 15 to advance workpiece.

DISPLAY RESPONSE TIME PROCESSOR: Delay between changing the number or cursor position in the display routine.

When the display reads:

| Up Adjust Times |
| --- |
| RT = Motor Speeds | it is possible to alter the logic used by the computer to select the speed for a certain drive length and to alter the reduced speed values for each one of the forward drive speeds. In the preferred form, there are a total of seven different drive speeds only one of which is used at a time and which should be selected in direct proportion to the drive length or frame dimension. Once a speed is selected, the display will display a "limit law" which is the maximum speed which should be selected for a given drive length or distance of travel in order to avoid dimensional inaccuracy in bending. Assuming that the speed selected is within the "Limit Law", the next switch should be depressed to display:

| Start Down at |
| --- |
| xxxxxxxxxxxxx |

No matter which speed is selected for a certain drive routine, there is always a ramp down speed or reduced speed just before the drive motor is braked, that distance being denominated as the "start down value". If there is an insufficient "start down value", dimensional inaccuracies may occur. For this reason, a specific correlation is established in the program between the distance, speed and number of pulses required to reduce the speed preliminary to braking.

Referring once again to the flow diagram of FIG. 9, in response to turning on the apparatus including the control console, the I/O latch 131 is disabled by the data bus 121 by writing binary ones. The address bus 122 is then set up by the primary decoder 127 to enable chip select functions, and the peripheral interface 132 is then set up by the output from the primary decoder and data bus 121 followed by activation of the LCD display 119 to generate the program menu from the CPU 120 and its associated memory. The program menu will first enable selection of a MAIN RUNNING PROGRAM or SET UP PROGRAM. If the MAIN RUNNING PROGRAM is selected, the operator then enters glass size in two dimensions, sightline and quantity to the CPU. This information is then loaded into the memory 123 and compared with the preselected speed of the drive motor. If the frame is too small for the speed setting, the program menu will then automatically return to the start of the program. If the frame is not too small, it will then proceed to automatically select the bend pattern and drive length prior to the first bend or cut operation depending upon the bend pattern calculated. A delay is then interposed during which the workpiece is advanced along the guide path until the leading end is resting in the main clamp 19. The main clamp solenoid 19' is then activated by a signal generated by the CPU via the I/O latch 131 to the appropriate solenoid 19'. At this point, the machine is ready to run and the operator has three options available: a "manual" option, "saw" option or "auto-start" option. If the "manual" mode is selected, the desired drive, bending and cutting operations can be manually controlled by the operator. If the "saw" option is selected by depressing "auto saw", the solenoids 30', 32' and 38' are simultaneously activated to perform a cutting operation.

If the "auto-start" option is selected, the control circuit will automatically and sequentially activate the drive solenoid 15', release the main clamp 19 via clamp solenoid 19', select the drive speed, start down value and total run or drive length via the 16-bit binary counter 128. Once selected, the drive motor 64 is activated for the motor drive wheel 15, and the optical encoder 16 will then automatically respond to movement of the workpiece along the guide path to generate binary pulses and transmit same to the binary counter 128. The drive motor will automatically run at the speed selected until the start down value is reached at which point the counter will through the CPU 120 automatically reduce the speed of the drive motor to the start down value or reduced speed setting. The counter 128 will then continue to count down to the last pulse of the start down value at which point the CPU 120 will deliver a signal via data bus 121 to the I/O latch 131 to dynamically brake the DC motor drive 64. After a momentary delay the split clamp solenoid 20' is activated followed by main clamp solenoid 19' and wipe clamp solenoid 21', at which time the rotary actuator is activated by solenoid 74' to cause a bend to be formed in the workpiece as described over a predetermined time interval established by the BEND UP TIME setting. After a predetermined interval, the wipe clamp solenoid 21', swing arm solenoid 74', split die clamp 20' and main clamp 19' are released.

The second side or drive length prior to the next bend or cut as calculated by the CPU 120 is then entered and the process of advancing the workpiece and bending or cutting is then repeated as described. As in the case of the auto saw option, whenever the CPU determines that the final dimension has been reached or is positioned in alignment with the saw, the "auto saw option" is automatically entered to perform the cutting operation.

Once the three bending operations and the cutting operation have been performed according to the bend pattern calculated by the CPU, a pause is introduced to permit removal of the frame, and the next section of the workpiece then is advanced along the guide path into the main clamp to begin the next sequence. Preferably, the workpiece is fed from a continuous length of tubing and can be done either manually or by automatic feed between each bending sequence.

The program permits introduction of various timing adjustments by selecting SET UP PROGRAM instead of MAIN RUNNING PROGRAM. If SET UP PROGRAM is selected, the I/O latch 131 is disabled, the address bus 122, peripheral interface 132 and display 119 are set up as in the MAIN RUNNING PROGRAM and a program menu is then displayed to lead the operator through the various time adjustment routines as described to alter both response and delay time.

In the preferred form of present invention, the programs are entered from a terminal into memory in "CAMBASIC" and following tabulation stored in EPROM memory between 8000-9FFF, A000-BFFF and C000-DFFF. See Table I below:

lead the operator through the various time adjustment routines as described to alter both response and delay time.

In the preferred form of present invention, the programs are entered from a terminal into memory in "CAMBASIC" and following tabulation stored in EPROM memory between 8000-9FFF, A000-BFFF and C000-DFFF. See Table I below:

TABLE I
*** Main Program - Frame Bending Machine ***

Starting Address: 8000

```
0CLEAR:X0=%#3F00:GO20
05IFTEST(46,0)=1RETURN
06OUT(33,255):OUT(34,8):OUT(47,0)
07IFTEST(46,0)=0DELAY(50):GO06
08CLEAR:GO0
10LETM0=M:DO:OUT(49,@M0):M0=M0+1:UNTIL@M0=13:RETURN
11GOSUB5:%#FFD4=#B500:%#FFD6=#B780:GOSUB0:REM     Bend Routine
12RESET(33,2):DELAY(50)
13%#FFD4=#AC00:GOSUB0
14SET(33,2):DELAY(400):RETURN:REM     Release Main Clamp
19FORI=0TO3:@(C+I)=@(D+I):DELAY(6):NEXTI:RETURN
20OUT(33,255):OUT(34,8):OUT(47,153):SET(45,0):DELAY(8):RESET(45,0)
25Y0=%#FFD4:Z0=%#FFD6:N0=1
30SET(45,6):OUT(48,13):OUT(48,8):OUT(48,10):OUT(48,14)
32M=#23E0:N=#23B0:U0=%#3FBE:V0=%#3FC0
35IFU0>=V0GO40
37OUT(48,1):$N="   Last Count    ":GOSUB1060
38IFTEST(44,4)=1DELAY(50):GO38
40$M="   TOOLS FOR":OUT(48,1):GOSUB10
50$M="    BENDING":OUT(48,192):GOSUB10:O0=%#3FE2:P0=%#3FE4:DELAY(500)
51$M=" Up runs Set-up":OUT(48,1):GOSUB10:OUT(48,192)
52$M="Next Starts Mach":GOSUB10
53IFTEST(44,3)=0%#FFD4=#9600:%#FFD6=#A541:GOSUB0:GO60
54IFTEST(44,5)=0V0=1:GO101
55GOSUB5:IFTEST(44,4)=1GO53
60$M="Enter Glass Size":OUT(48,1):GOSUB10
65LETS=%#3F04:LETT=%#3F06
70%#FFD4=#AE00:%#FFD6=#B445:GOSUB0
71C=#3F04:D=#2058:GOSUB19:$N=$M
72$M="Enter Sightline:":OUT(48,1):GOSUB10
73S=%#3F02/2:%#FFD4=#BA00:GOSUB0:S0=S0*2
74@#3F02=@#2058:DELAY(10):@#3F03=@#2059:DELAY(10)
80LETO0=%#3F04-%#3F02:LETP0=%#3F06-%#3F02:C=#3FE2:D=#2050:GOSUB19
85IFP0<400GO105
90$M="Enter No. Frames":OUT(48,1):GOSUB10
100S=1:%#FFD4=#BA00:%#FFD6=#BECF:GOSUB0:V0=S0:@#3FC0=@#205E:DELAY(6)
101@#3FC1=@#205F:DELAY(6):W0=0:IFP0>%#3F08THENW0=3:GO110:REM     BBBC
102IF(O0+P0)>%#3F0ATHENW0=1:GO110:REM     BBCB
```

```
103IF(O0+(2*P0))>%#3F0CTHENW0=2:GO110:REM    BCBB
104IF((2*O0)+(2*P0))>%#3F0ETHENW0=4:GO110:REM    CBBB
105$M="Frame Too Small":OUT(48,1):GOSUB10
106$M="Next Starts Over":OUT(48,192):GOSUB10
107IFTEST(44,4)=1DELAY(50):GO107
108GO60
110FORU0=1 TO V0
111@#3FBE=@#205C:DELAY(6):@#3FBF=@#205D
115$M="   Locate Stock":OUT(48,1):GOSUB10
120OUT(33,251):REM    Ready to Locate
130OUT(48,192):$M="Then Auto-Start":GOSUB10
131@#23FF=1
135GOSUB5:IFTEST(44,7)=0GOSUB1005
136IFTEST(44,5)=0SET(33,2):GO136
137RESET(33,2)
140IFTEST(44,6)=1THENDELAY(5):GO135
141@#23FF=0
150RESET(33,0):DELAY(%#3FF0):REM    Close Drive Clamp
160SET(33,2):DELAY(%#3FF2):REM     Release Main Clamp
161IFN0=0GOSUB1060:GO170
162$M="  Running Size":OUT(48,1):GOSUB10:OUT(48,192)
163$M=$N:GOSUB10
170IFW0=1GO500:REM                BBCB Pattern
180IFW0=2GO600:REM                BCBB
190IFW0=3GO400:REM                BBBC
300LETX=(2*O0)+(2*P0)-%#3F10:LINK#BF00:LETA0=Y-2:GOSUB1000:REM    CBBB Pattern
310LETX=O0-X+%#3F12:LINK#BF00:LETA0=Y+2:GOSUB11
320LETX=P0-%#3F14:LINK#BF00:LETA0=Y:GOSUB11
330LETX=O0-%#3F16:LINK#BF00:LETA0=Y:GOSUB11
340GO670
400LETX=O0+%#3F18:LINK#BF00:LETA0=Y:GOSUB11:REM           BBBC Pattern
410LETX=P0-%#3F1A:LINK#BF00:LETA0=Y:GOSUB11
420LETX=O0-%#3F1C:LINK#BF00:LETA0=Y:GOSUB11
430LETX=P0-%#3F1E:LINK#BF00:LETA0=Y:GOSUB1000
440GO670
500LETX=O0+%#3F20:LINK#BF00:LETA0=Y:GOSUB11:REM           BBCB Pattern
510LETX=P0-%#3F22:LINK#BF00:LETA0=Y:GOSUB11
520LETX=O0+P0-%#3F24:LINK#BF00:LETA0=Y:GOSUB1000
540LETX=O0-X-%#3F26:LINK#BF00:LETA0=Y:GOSUB11
550GO670
600LETX=O0+%#3F28:LINK#BF00:LETA0=Y:GOSUB11:REM           BCBB Pattern
620LETX=O0+(P0*2)-%#3F2A:LINK#BF00:LETA0=Y:GOSUB1000
640LETX=P0-X-%#3F2C:LINK#BF00:LETA0=Y:GOSUB11
650LETX=O0-%#3F2E:LINK#BF00:LETA0=Y:GOSUB11
670OUT(33,255):DELAY(%#3FF4)
690NEXTU0:GO51
1000GOSUB5:%#FFD4=#B500:%#FFD6=#B780:GOSUB0:REM   Saw Routine
1001RESET(33,2):DELAY(50)
1005RESET(33,5):DELAY(%#3FFE):RESET(33,6):DELAY(%#3FFC)
1010RESET(33,7):DELAY(%#3FFA):SET(33,7):DELAY(%#3FF8)
1015SET(33,6):DELAY(50)
1022SET(33,5):IF@#23FF=1U=0:V=0:RETURN
1025SET(33,2):DELAY(%#3FF6):RETURN
1060GOSUB5:$M="No.        of         "
1070@(M+4)=MOD((U0/10000),10)+48:IF@(M+4)=48@(M+4)=32
1080@(M+5)=MOD((U0/1000),10)+48:IF(@(M+5)=48)AND(@(M+4)=32)@(M+5)=32
1090@(M+6)=MOD((U0/100),10)+48:IF(@(M+6)=48)AND(@(M+5)=32)@(M+6)=32
1100@(M+7)=MOD((U0/10),10)+48:IF(@(M+7)=48)AND(@(M+6)=32)@(M+7)=32
1110@(M+8)=MOD(U0,10)+48
1130@(M+11)=MOD((V0/10000),10)+48:IF@(M+11)=48@(M+11)=32
1140@(M+12)=MOD((V0/1000),10)+48:IF(@(M+12)=48)AND(@(M+11)=32)@(M+12)=32
1150@(M+13)=MOD((V0/100),10)+48:IF(@(M+13)=48)AND(@(M+12)=32)@(M+13)=32
1160@(M+14)=MOD((V0/10),10)+48:IF(@(M+14)=48)AND(@(M+13)=32)@(M+14)=32
1170@(M+15)=MOD(V0,10)+48:OUT(48,2):GOSUB10:OUT(48,192):$M=$N:GOSUB10:RETURN
```

*** End of Main Program ***

*** Set-Up Program ***

```
Starting Address: 9600

0M=#23E0:GO20
05X=#3800+(S0*4):Y=X+2:RETURN
10LETM0=M:DO:OUT(49,@M0):M0=M0+1:UNTIL@M0=13:RETURN
20IFN0=0$M="Auto-Locator Off":OUT(48,1):GOSUB10:GO40
30IFN0=1$M="Auto-Locator On":OUT(48,1):GOSUB10
40OUT(48,192):$M="Toggle or Next?":GOSUB10
50IF(TEST(44,5)=0)AND(N0=0)N0=1:GO30
60IF(TEST(44,5)=0)AND(N0=1)N0=0:GO20
70IFTEST(44,4)=1GO50
80$M="Current Size is":OUT(48,1):GOSUB10:OUT(48,192)
90A0=Y0:B0=Z0:REM                Hold Main Program Address
100Y0=%#FFD4:Z0=%#FFD6:%#FFD4=#AE00:%#FFD6=#B445:S=O0:T=P0:GOSUB0
105O0=S0:P0=T0
110OUT(48,2):$M="AutoStart Stores":GOSUB10
120IFTEST(44,4)=0GO200
130IFTEST(44,6)=1DELAY(50):GO120
140$M=" Enter Location:":OUT(48,1):GOSUB10
150Y0=%#FFD4:Z0=%#FFD6:%#FFD4=#BA00:%#FFD6=#BEC7:S=0:GOSUB0
160IFS0>300$M="  Out of Range":OUT(48,1):GOSUB10
165IFS0>300$M="  ( 0 - 300 Only)":OUT(48,192):GOSUB10:DELAY(1000):GO140
170GOSUB5:IF(%X<>0)OR(%Y<>0)GOSUB1000:IFC=0GO140
180OUT(48,1):GOSUB1100:$M="   Recorded!":GOSUB10:DELAY(500)
200$M="Up Recalls From":OUT(48,1):GOSUB10:OUT(48,192)
210$M="     Memory":GOSUB10
220IFTEST(44,4)=0GO300
230IFTEST(44,3)=1DELAY(50):GO220
240$M=" Enter Location:":OUT(48,1):GOSUB10
250Y0=%#FFD4:Z0=%#FFD6:%#FFD4=#BA00:%#FFD6=#BEC7:S=0:GOSUB0
260IFS0>300$M="  Out of Range":OUT(48,1):GOSUB10:DELAY(1000):GO240
270GOSUB05:GOSUB1110:S=O0:T=P0
280$M="Value Loaded Is":OUT(48,1):GOSUB10
290Y0=%#FFD4:Z0=%#FFD6:%#FFD4=#AE00:%#FFD6=#B445:GOSUB0:O0=S0:P0=T0
295%#2302=S0:%#2304=T0:GO200
300$M="AutoStart to Run":DELAY(500):OUT(48,1):GOSUB10:OUT(48,192)
310$M="Up Adjusts Times":GOSUB10
320IFTEST(44,6)=0%#FFD4=A0:%#FFD6=B0:Y0=A0:Z0=B0:RETURN
330IFTEST(44,3)=1DELAY(50):GO320
331OUT(48,1):GOSUB10:OUT(48,192):$M="Rt = Motor Ramp ":GOSUB10
332IFTEST(44,3)=0GO340
333IFTEST(44,0)=1DELAY(50):GO332
334GO500
340$M="All Times Are In":OUT(48,1):GOSUB10:OUT(48,192)
350$M="  Milliseconds":GOSUB10:DELAY(500)
360$M="Saw On Delay":OUT(48,1):GOSUB10:T=#3FFE:S=%T:GOSUB1200
370$M="SawAdvance Delay":OUT(48,1):GOSUB10:T=#3FFC:S=%T:GOSUB1200
380$M="Saw On Duration":OUT(48,1):GOSUB10:T=#3FFA:S=%T:GOSUB1200
390$M="Saw Off Delay":OUT(48,1):GOSUB10:T=#3FF8:S=%T:GOSUB1200
400$M="Saw Exit Delay":OUT(48,1):GOSUB10:T=#3FF6:S=%T:GOSUB1200
410$M="AutoPart Release":OUT(48,1):GOSUE10:T=#3FF4:S=%T:GOSUB1200
420$M="Main Clamp Open":OUT(48,1):GOSUB10:T=#3FF2:S=%T:GOSUB1200
430$M="DriveClamp Close":OUT(48,1):GOSUB10:T=#3FF0:S=%T:GOSUB1200
440$M="Bend Clamps Wait":OUT(48,1):GOSUB10:T=#3FEE:S=%T:GOSUB1200
450$M="Bend Up Time":OUT(48,1):GOSUB10:T=#3FEC:S=%T:GOSUB1200
460$M="WipeRelease Time":OUT(48,1):GOSUB10:T=#3FEA:S=%T:GOSUB1200
470$M="Bend Return Wait":OUT(48,1):GOSUB10:T=#3FE8:S=%T:GOSUB1200
480$M="Display Response":OUT(48,1):GOSUB10:T=#3FE6:S=%T:GOSUB1200
490%#FFD4=A0:%#FFD6=B0:Y0=A0:Z0=B0:RETURN
500$M="Values Shown Are":OUT(48,1):GOSUB10:OUT(48,192)
510$M="  Pulse  Counts":GOSUB10:DELAY(400)
520$M="Speed Ranges Are":OUT(48,1):GOSUB10:OUT(48,192)
530$M="   From 1 to 7":GOSUB10:DELAY(400)
540$M="  Enter Speed":OUT(48,1):GOSUB10
550S=0:Y0=%#FFD4:Z0=%#FFD6:%#FFD4=#BA00:%#FFD6=#BECA:GOSUB0
560IFS0=0GO300
570IF(S0<1)OR(S0>7)GO520
580X=S0:$M="  Ramp Up Limit:":@M=@#2058 + 48:OUT(48,1):GOSUB10
590T=#3FC0+(2*X):S=%T:GOSUB1200
600$M="  Start Down At:":@M=@#202E+48:OUT(48,1):GOSUB10
610T=#3FD0+(2*X):S=%T:GOSUB1200
620GO300
```

```
1000$M=" Location Holds":OUT(48,1):GOSUB10
1010Y0=%#FFD4:Z0=%#FFD6:%#FFD4=#AE00:%#FFD6=#B445:S=%X:T=%Y:GOSUB0
1020$M=" Up  Overwrites;":OUT(48,1):GOSUB10:OUT(48,192)
1030$M="Down Tries Again":GOSUB10
1040IFTEST(44,3)=0C=1:RETURN
1050IFTEST(44,2)=0C=0:RETURN
1060GO1040
1100FORI=0TO3:@(X+I)=@(#2050+I):DELAY(10):NEXTI:RETURN
1110FORI=0TO3:@(#2050+I)=@(X+I):NEXTI:RETURN
1200Y0=%#FFD4:Z0=%#FFD6:%#FFD4=#BA00:%#FFD6=#BEC7:GOSUB0
1210IFS0=S$M="   No Change":OUT(48,1):GOSUB10:DELAY(200):RETURN
1220IFS0<>S@T=@#2058:DELAY(10):@(T+1)=@#2059:DELAY(10)
1230IF%T=S0$M="   Recorded":OUT(48,1):GOSUB10:DELAY(200):RETURN
1240$M="Error in Memory":OUT(48,1):GOSUB10:DELAY(1000):RETURN
```

*** End of Set-Up Routine ***

*** Bending Subroutine ***

Starting Address: AC00

```
0REM       *** BEND ROUTINE ***
10OUT(33,240):DELAY(%#3FEE):REM   CLOSE CLAMPS
20RESET(33,4):DELAY(%#3FEC):REM   ACTIVATE BEND CYLINDER
30SET(33,3):SET(33,1):DELAY(%#3FEA):REM   RELEASE WIPE, SPLIT CLAMPS
40SET(33,4):DELAY(%#3FE8):REM   RELEASE BEND CYLINDER
50SET(33,2):REM  RELEASE MAIN CLAMP
60%#FFD4=Y0:%#FFD6=Z0:RETURN
```

*** End of Bending Subroutine ***

*** Motor Drive Subroutine ***

Starting Address: B500

```
0GO30:REM            *** MOTOR DRIVE SUBROUTINE ***
10OUT(34,0):RETURN
30A=0:B=A0
40IFA0>%#3FCETHENA=7:B=A0-%#3FDE:GO49:REM       Limit Ramp Up
41IFA0>%#3FCCTHENA=6:B=A0-%#3FDC:GO49
42IFA0>%#3FCATHENA=5:B=A0-%#3FDA:GO49
43IFA0>%#3FC8THENA=4:B=A0-%#3FD8:GO49
44IFA0>%#3FC6THENA=3:B=A0-%#3FD6:GO49
45IFA0>%#3FC4THENA=2:B=A0-%#3FD4:GO49
46IFA0>%#3FC2THENA=1:B=A0-%#3FD2
49PR"Speed: ",A," Ramp Down at ",B," Total Run = ",A0
50OUT(45,24):OUT(34,A)
55OUT(43,120):OUT(41,@#2002):OUT(41,@#2003)
60OUT(43,48):OUT(40,@#2034):OUT(40,@#2035)
70DELAY(10):ON2,10:STAT=1
90IFTEST(46,1)=1SET(45,6):RESET(45,3):%#FFD4=Y0:%#FFD6=Z0:RETURN
95GO90
```

*** End of Motor Drive Subroutine ***

Although the present invention has been described in connection with one preferred embodiment, it will be appreciated that various modifications and changes may be resorted to without departing from the spirit and scope thereof. For example, numerous different shapes and numbers of bends may be employed, such as, L-shaped or J-shaped by introducing suitable program variations. It is therefore intended that the present invention be limited only as defined by the claims and reasonable equivalents thereof.

Although the present invention has been described in connection with one preferred embodiment, it will be appreciated that various modifications and changes may be resorted to without departing from the spirit and scope thereof. For example, numerous different shapes and numbers of bends may be employed, such as, L-shaped or J-shaped by introducing suitable program variations. It is therefore intended that the present invention be limited only as defined by the claims and reasonable equivalents thereof.

We claim:

1. A frame bending machine for automatically bending a continuous length of tubular stock material of generally rectangular cross-section, said machine comprising:
   a platform;
   drive means including releasable clamping means engageable with said stock material for advancing said material along a straight guide path on said platform, travel-sensing means associated with said drive means to sense the distance of travel of said stock material along the guide path;
   bending die means at one end of said guide path for receiving each leading end of said stock material, said bending die means having a rotatable die member and means for activating said die member to advance it into clamping engagement with said stock material as said die member is rotated through an angle approximating 90° whereby to bend said stock material to a corresponding angle; and
   programmable circuit means storing information from said travel-sensing means to activate said drive means at a predetermined rate of speed correlated with the distance of travel of said stock material between said successive bends, said programmable circuit means including means programmed to activate said drive means to successively advance said stock material a predetermined distance between said successive bends, simultaneously release said releasable clamping means and activate said bending die means to form a bend in said stock material, followed by releasing said bending die means and activating said releasable clamping means to advance a predetermined length of material for each next successive bend.

2. A frame bending machine according to claim 1, including cutter means at a leading end of the guide path opposite to said bending die means, and means in said programmable circuit means for activating said cutting means in response to advancement of a predetermined length of stock material along the guide path.

3. A frame bending machine according to claim 1, said programmable circuit means having a plurality of program units for determining a predetermined sequence of bending and cutting steps for bending a known length of said material into a rectangular frame.

4. A frame bending machine according to claim 3, including data processing means for comparing data relating to the length of sides of each rectangular frame to be formed with programmed values and for generating control signals applied to said drive means to control the speed of travel of said material between said successive bends in response to program values selected by said data processing means.

5. A frame bending machine according to claim 1, said distance sensing means defined by an optical encoder and a wheel member rotated by the advancement of said stock material along the guide path, said drive means including a drive wheel member in juxtaposition to said optical encoder wheel member on one side of said guide path in opposed confronting relation to said releasable clamping means.

6. A frame bending machine according to claim 5, said releasable clamping means defined by a pair of spaced rollers aligned with said drive motor wheel member and optical encoder wheel member, cylinder means activated by said programmed means to urge said rollers against said material and releasably clamp said material between said rollers and said wheel members.

7. A frame bending machine according to claim 1, said bending die means including first clamp means operative when activated to engage said stock material against said die member and second clamp means operative when activated to engage said stock material at the bending area and apply pressure in a direction normal to the direction of bending.

8. A frame bending machine according to claim 7, said first clamp means disposed upstream of said second clamp means.

9. A frame bending machine for automatically bending a continuous length of tubular stock material into a rectangular frame having an irregular cross-section with spaced parallel sides separated by an inner spacer portion, said apparatus comprising:
   an inclined work table;
   motor drive means including releasable clamping means engageable with said stock material for advancing said material along a straight guide path, travel sensing means associated with said drive means to sense the distance of travel of said stock material along the guide path and producing a signal relating thereto;
   bending die means at one end of said guide path for receiving each leading end of said stock material, said bending die means having a rotatable die member and means for activating said die member to advance it into clamping engagement with said stock material as said die member is rotated through an angle approximating 90°;
   data input means for inputting information relating to the length of each side of said frame between successive bends;
   programmable circuit means storing information from said travel sensing means and said data input means and operative to activate said drive means at a predetermined rate of speed correlated with the distance of travel of said stock material between said successive bends, means programmed to successively advance said stock material for a predetermined distance between said successive bends, release said releasable clamping means and activate said bending die means to form a bend in said stock material, followed by successively releasing said bending die means and activating said releasable clamping means to advance a predetermined length of material for each next successive bend; and
   cutter means at a leading end of the guide path opposite to said bending die means, and means in said circuit means for activating said cutter means in response to advancement of a predetermined length of stock material along the guide path.

10. A frame bending machine according to claim 9, said programmable circuit means having a plurality of program units for determining a sequential pattern of bending and cutting steps for a given length of said material and for regulating the speed of advancement of said material between said successive bending and cutting steps.

11. A frame bending machine according to claim 9, including data processing means associated with said data input means for comparing data relating to the length of sides with programmed values and for generating control signals applied to said motor drive means to control the speed of travel of said material between said successive bends in response to the programmed values selected by said data processing means.

12. A frame bending machine according to claim 11, including motor controller means for regulating the speed of said motor drive means, said programmed means having a plurality of maximum speed settings and a reduced speed value for said maximum speed settings, said data processing means generating a control signal to energize said motor drive means at said maximum speed setting followed by said reduced speed value for each length of material advanced between successive bends.

13. A frame bending machine according to claim 12, said data input means operative to input information relating to a maximum speed setting, and said programmed means comparing the maximum speed setting selected with said programmed values to generate a corresponding control signal to regulate the speed of said motor drive means.

14. A frame bending machine according to claim 9, said bending die means including means for controlling the speed of rotation of said rotatable die member.

15. In a frame bender for forming a series of successive bends in a length of metal tubing and cutting same to define a four-sided rectangular frame for a window pane wherein motor drive means are provided to engage and advance said tubing along a guide path, bending means is positioned at one end of the guide path to clamp and bend said tubing and cutter means is provided at the opposite end of the guide path to clamp and cut said tubing, the combination therewith comprising:

a programmable control circuit;

manual input means for supplying data to said control circuit relating to the length of each side of said frame and sightline; and data processing means for comparing the data entered by said manual input means with programmed values whereby to generate control signals to automatically and sequentially regulate the speed of advancement of said tubing according to the length of each side, interrupt the advancement of said tubing and activate said bending means to form a succession of 90° bends in said tubing, and to interrupt advancement of said tubing to cut said tubing at a point corresponding to the dimensions of each frame.

16. A frame bender according to claim 15, said data processing means operative to generate a control signal to determine the sequence of bending and cutting in relation to the dimensions of each frame.

17. A frame bender according to claim 15, said data processing means operative to vary the speed of advancement of said tubing between successive bends to accelerate the advancement of said tubing to a maximum speed followed by a reduced speed preliminary to interrupting advancement of said tubing to form each 90° bend therein.

18. A frame bender according to claim 15, including manual mode means overriding said data processing means to selectively bend and cut said tubing independently of said data processing means.

19. A frame bender according to claim 15, said manual input means including means for adjusting the speed of advancement of said length of tubing for a given length of each side of said frame.

20. A frame bender according to claim 15, each of said bending and cutting means including clamping members and solenoid activated cylinder means for activating said clamping means in response to control signals received from said data processing means.

* * * * *